(12) United States Patent
Yamanishi et al.

(10) Patent No.: US 11,764,378 B2
(45) Date of Patent: Sep. 19, 2023

(54) REDOX FLOW BATTERY SYSTEM AND METHOD FOR OPERATING REDOX FLOW BATTERY SYSTEM

(71) Applicant: SUMITOMO ELECTRIC INDUSTRIES, LTD., Osaka (JP)

(72) Inventors: Katsuya Yamanishi, Osaka (JP); Yasumitsu Tsutsui, Osaka (JP); Takahiro Kumamoto, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 515 days.

(21) Appl. No.: 16/619,556

(22) PCT Filed: Mar. 14, 2018

(86) PCT No.: PCT/JP2018/009834
§ 371 (c)(1),
(2) Date: Dec. 5, 2019

(87) PCT Pub. No.: WO2018/235355
PCT Pub. Date: Dec. 27, 2018

(65) Prior Publication Data
US 2020/0136162 A1    Apr. 30, 2020

(30) Foreign Application Priority Data
Jun. 20, 2017    (JP) .................................. 2017-120659

(51) Int. Cl.
*H01M 8/00*    (2016.01)
*H01M 8/04858*    (2016.01)
(Continued)

(52) U.S. Cl.
CPC ... *H01M 8/04947* (2013.01); *H01M 8/04186* (2013.01); *H01M 8/04201* (2013.01); *H01M 8/04671* (2013.01); *H01M 8/188* (2013.01)

(58) Field of Classification Search
CPC ......... H01M 8/04947; H01M 8/04186; H01M 8/04201; H01M 8/04671; H01M 8/188
See application file for complete search history.

(56) References Cited

U.S. PATENT DOCUMENTS

2004/0169493 A1*  9/2004  Tsutsui .................. H01M 50/77
                                                          320/128
2014/0193724 A1*  7/2014  Daniel .............. H01M 8/04276
                                                           429/408
(Continued)

FOREIGN PATENT DOCUMENTS

JP      S62-35461 A      2/1987
JP      2002-175822 A    6/2002
(Continued)

OTHER PUBLICATIONS

Sugimasa et al., Electrolytic Solution for Redox Flow Battery and Redox Flow Battery Arranged by Use Thereof, Jun. 2016, See the Abstract. (Year: 2016).*

*Primary Examiner* — Cynthia H Kelly
*Assistant Examiner* — Monique M Wills
(74) *Attorney, Agent, or Firm* — Oliff PLC

(57) ABSTRACT

A redox flow battery system includes a cell that performs charging and discharging between the cell and a power system, a tank that stores an electrolyte supplied to the cell, a circulation pump that circulates the electrolyte between the cell and the tank, a power converter disposed between the cell and the power system, and a charge/discharge control unit that controls an operation of the power converter to control charging and discharging of the cell. When the charge/discharge control unit detects power failure in the power system, the charge/discharge control unit controls the power converter such that power of the electrolyte remaining in the cell is supplied to the circulation pump.

4 Claims, 5 Drawing Sheets

(51) Int. Cl.
*H01M 8/04186* (2016.01)
*H01M 8/04082* (2016.01)
*H01M 8/04664* (2016.01)
*H01M 8/18* (2006.01)

(56) References Cited

U.S. PATENT DOCUMENTS

2017/0033391 A1    2/2017   Kumamoto et al.
2018/0013156 A1    1/2018   Yamanishi et al.

FOREIGN PATENT DOCUMENTS

| | | | | |
|---|---|---|---|---|
| JP | 2004-55174 A | 2/2004 | | |
| JP | 2006-012425 A | 1/2006 | | |
| JP | 2012-164530 A | 8/2012 | | |
| JP | 2015-156266 A | 8/2015 | | |
| JP | 2016103386 A | * 6/2016 | ............ | H01M 8/188 |
| KR | 10-2016-0115477 A | 10/2016 | | |
| TW | 201633591 A | 9/2016 | | |
| TW | 201637271 A | 10/2016 | | |

* cited by examiner

REDOX FLOW BATTERY SYSTEM AND METHOD FOR OPERATING REDOX FLOW BATTERY SYSTEM

TECHNICAL FIELD

The present invention relates to a redox flow battery system and a method for operating a redox flow battery system.

The present application claims priority from Japanese Patent Application No. 2017-120659 filed on Jun. 20, 2017, and the entire contents of the Japanese patent application are incorporated herein by reference.

BACKGROUND ART

Patent Literature 1 discloses a redox flow battery system including a cell that performs charging and discharging between the cell and a power system, a tank that stores an electrolyte supplied to the cell, a circulation pump that circulates the electrolyte between the cell and the tank, and a power converter (alternating current/direct current converter) disposed between the cell and the power system.

CITATION LIST

Patent Literature

PTL 1: Japanese Unexamined Patent Application Publication No. 2012-164530

SUMMARY OF INVENTION

A redox flow battery system according to the present disclosure includes
- a cell that performs charging and discharging between the cell and a power system,
- a tank that stores an electrolyte supplied to the cell,
- a circulation pump that circulates the electrolyte between the cell and the tank,
- a power converter disposed between the cell and the power system, and
- a charge/discharge control unit that controls an operation of the power converter to control charging and discharging of the cell.

When the charge/discharge control unit detects power failure in the power system, the charge/discharge control unit controls the power converter such that power of the electrolyte remaining in the cell is supplied to the circulation pump.

A method for operating a redox flow battery system according to the present disclosure is
- a method for operating a redox flow battery that circulates an electrolyte to a cell with a circulation pump and that operates, with a charge/discharge control unit, a power converter disposed between the cell and a power system to perform charging and discharging between the cell and the power system.

During power failure in the power system, the charge/discharge control unit restarts the power converter with power of the electrolyte remaining in the cell to resume circulation of the electrolyte into the cell by supplying the power through the power converter to the circulation pump, thereby performing discharging from the cell to the power system.

DESCRIPTION OF EMBODIMENTS

Figure 1:
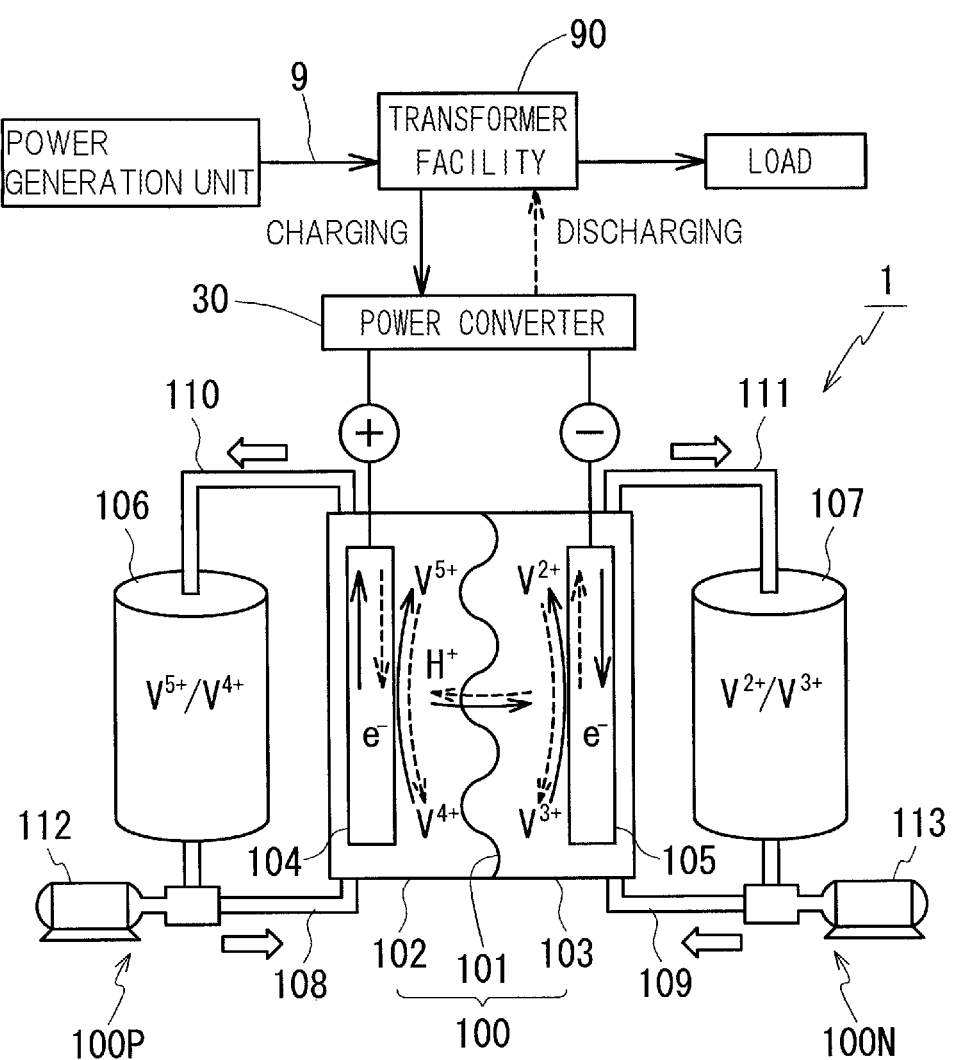
FIG. 1 is a diagram illustrating an operating principle of a redox flow battery.

Problems to be Solved by Present Disclosure

Although a redox flow battery system is used as countermeasures against momentary voltage drop and the like, the redox flow battery system cannot perform discharging to a power system on its own if power failure occurs in the power system. This is because, when circulation pumps that circulate electrolytes in a cell stop, the redox flow battery system cannot continuously perform charging and discharging. As a countermeasure against this, in Patent Literature 1, an uninterruptible power supply (UPS) that drives circulation pumps during power failure in a power system is provided. However, since the size of the UPS for securing the power for operating the circulation pumps is increased in accordance with the battery capacity of a redox flow battery, a large installation space and a high installation cost are necessary.

Accordingly, an object of the present disclosure is to provide a redox flow battery system capable of performing discharging to a power system on its own during power failure in the power system. Another object of the present disclosure is to provide a method for operating a redox flow battery system, the method being capable of restarting a redox flow battery system on its own during power failure in a power system.

Advantageous Effects of Present Disclosure

The redox flow battery system according to the present disclosure is capable of operating a circulation pump on its own during power failure in a power system.

According to the method for operating a redox flow battery system of the present disclosure, a redox flow battery system can restart on its own during power failure in a power system.

Description of Embodiments of Present Invention

First, the contents of embodiment according to the present invention will be listed and described.

<1> A redox flow battery system according to an embodiment includes
- a cell that performs charging and discharging between the cell and a power system,
- a tank that stores an electrolyte supplied to the cell,
- a circulation pump that circulates the electrolyte between the cell and the tank,
- a power converter disposed between the cell and the power system, and
- a charge/discharge control unit that controls an operation of the power converter to control charging and discharging of the cell.

When the charge/discharge control unit detects power failure in the power system, the charge/discharge control unit controls the power converter such that power of the electrolyte remaining in the cell is supplied to the circulation pump.

According to the above configuration, during power failure in the power system, the circulation pump can be operated by using the power of the electrolyte remaining in the cell. Once the circulation pump can be operated, power of the electrolyte stored in the tank can be drawn, and the operation of the circulation pump can be further continued by the power. As a result, the power of the electrolyte in the tank can be discharged to the power system. Thus, the redox flow battery system according to the embodiment can perform discharging to the power system on its own.

The redox flow battery system according to the embodiment, the redox flow battery system being capable of performing discharging on its own during power failure in the power system, does not require an UPS. Since no UPS is necessary, for example, the following advantages can be achieved.

[1] Since the space for installing the UPS need not be secured, the degree of freedom of the installation location of the redox flow battery system is high.

[2] The battery capacity of the redox flow battery system can be enhanced by, for example, installing a larger tank in the space that has been used as the space for installing the UPS.

[3] The labor and cost of the installation of the UPS can be reduced.

<2> In an exemplary embodiment of the redox flow battery system according to the embodiment,
the redox flow battery system includes a valve provided in a pipe that extends from the circulation pump toward the cell.

When circulation of the electrolyte is stopped, the charge/discharge control unit closes the valve to cause the electrolyte to remain in the cell.

In the redox flow battery system, in some cases, the circulation pump may be stopped during the operation of the system to stop circulation of the electrolyte to the cell. In such a case, the valve provided in the pipe that extends from the circulation pump toward the cell is closed so that the electrolyte remains in the cell. Accordingly, even if power failure in the power system occurs while the circulation pump is stopped, the redox flow battery system according to the embodiment can perform discharging to the power system on its own because the electrolyte remains in the cell.

<3> In an exemplary embodiment of the redox flow battery system according to the embodiment,
the tank is positioned such that a liquid level of the electrolyte stored in the tank is higher than an upper end of the cell.

With the above configuration, even if power failure in the power system occurs while the circulation pump is stopped, the redox flow battery system according to the embodiment can perform discharging to the power system on its own because the electrolyte remains in the cell. This is because since the liquid level of the electrolyte in the tank is located at a position higher than the upper end of the cell, a state where the electrolyte remains in the cell is provided by the gravity even when the circulation pump is stopped.

<4> A method for operating a redox flow battery system according to an embodiment is
a method for operating a redox flow battery that circulates an electrolyte to a cell with a circulation pump and that operates, with a charge/discharge control unit, a power converter disposed between the cell and a power system to perform charging and discharging between the cell and the power system.

During power failure in the power system, the charge/discharge control unit restarts the power converter with power of the electrolyte remaining in the cell to resume circulation of the electrolyte into the cell by supplying the power through the power converter to the circulation pump, thereby performing discharging from the cell to the power system.

According to the method for operating a redox flow battery system, the redox flow battery system can perform discharging to a power system on its own. This is because during power failure in the power system, the circulation pump can be operated by using power of the electrolyte remaining in the cell. Once the circulation pump can be operated, power of the electrolyte stored in the tank can be drawn, and the operation of the circulation pump can be further continued by the power.

<5> In an exemplary embodiment of the method for operating a redox flow battery system according to the embodiment,
during a period with no power failure in the power system, charging and discharging of the cell are performed such that power of the electrolyte in the cell is not lower than power necessary for resuming circulation of the electrolyte by the circulation pump.

During a period with no power failure in the power system, charging and discharging of the cell are performed such that the power of the electrolyte remaining in the cell is not lower than power necessary for restarting the circulation pump, and consequently, during power failure in the power system, the circulation pump can be reliably operated.

Details of Embodiments of Present Invention

Hereafter, a redox flow battery system and a method for operating the redox flow battery system according to embodiments of the present disclosure will be described. The scope of the present invention is not limited to configurations described in the embodiments, but is defined by the appended claims, and is intended to cover all modifications within the meaning and scope equivalent to those of the claims.

Embodiment 1

Prior to a description of a redox flow battery system according to an embodiment, a basic configuration of a redox flow battery (hereinafter, RF battery) will be described with reference to FIGS. 1 to 3.

<<RF Battery>>

An RF battery 1 is one of electrolyte-circulating storage batteries and is used for, for example, storage of electricity of new energy from solar photovoltaic power generation or wind power generation. An operating principle of the RF battery 1 will be described with reference to FIG. 1. The RF battery 1 is a battery that performs charging and discharging using the difference between an oxidation-reduction potential of active material ions contained in a positive electrolyte and an oxidation-reduction potential of active material ions contained in a negative electrolyte. The RF battery 1 is connected through a power converter 30 to a transformer facility 90 in a power system 9 and performs charging and discharging between the RF battery 1 and the power system 9. The power system 9 of this example is a power system that performs alternating-current power transmission, and the power converter 30 is an alternating current/direct current converter. The power system may be a power system that performs direct-current power transmission. In such a case, the power converter is a direct current/direct current converter. The RF battery 1 includes a cell 100 divided into a positive electrode cell 102 and a negative electrode cell 103 by a membrane 101 that allows hydrogen ions to permeate therethrough.

The positive electrode cell 102 includes a positive electrode 104. A positive electrolyte tank 106 that stores a positive electrolyte is connected through pipes 108 and 110 to the positive electrode cell 102. The pipe 108 is provided with a circulation pump 112. These components 106, 108, 110, and 112 form a positive electrolyte circulation mechanism 100P that circulates the positive electrolyte. Similarly, the negative electrode cell 103 includes a negative electrode 105. A negative electrolyte tank 107 that stores a negative electrolyte is connected through pipes 109 and 111 to the negative electrode cell 103. The pipe 109 is provided with a circulation pump 113. These components 107, 109, 111, and 113 form a negative electrolyte circulation mechanism 100N that circulates the negative electrolyte. During charging and discharging, the electrolytes stored in the tanks 106 and 107 are circulated in the cells 102 and 103 by the circulation pumps 112 and 113, respectively. When charging and discharging are not performed, the circulation pumps 112 and 113 are stopped and the electrolytes are not circulated.

[Cell Stack]

Figure 2:
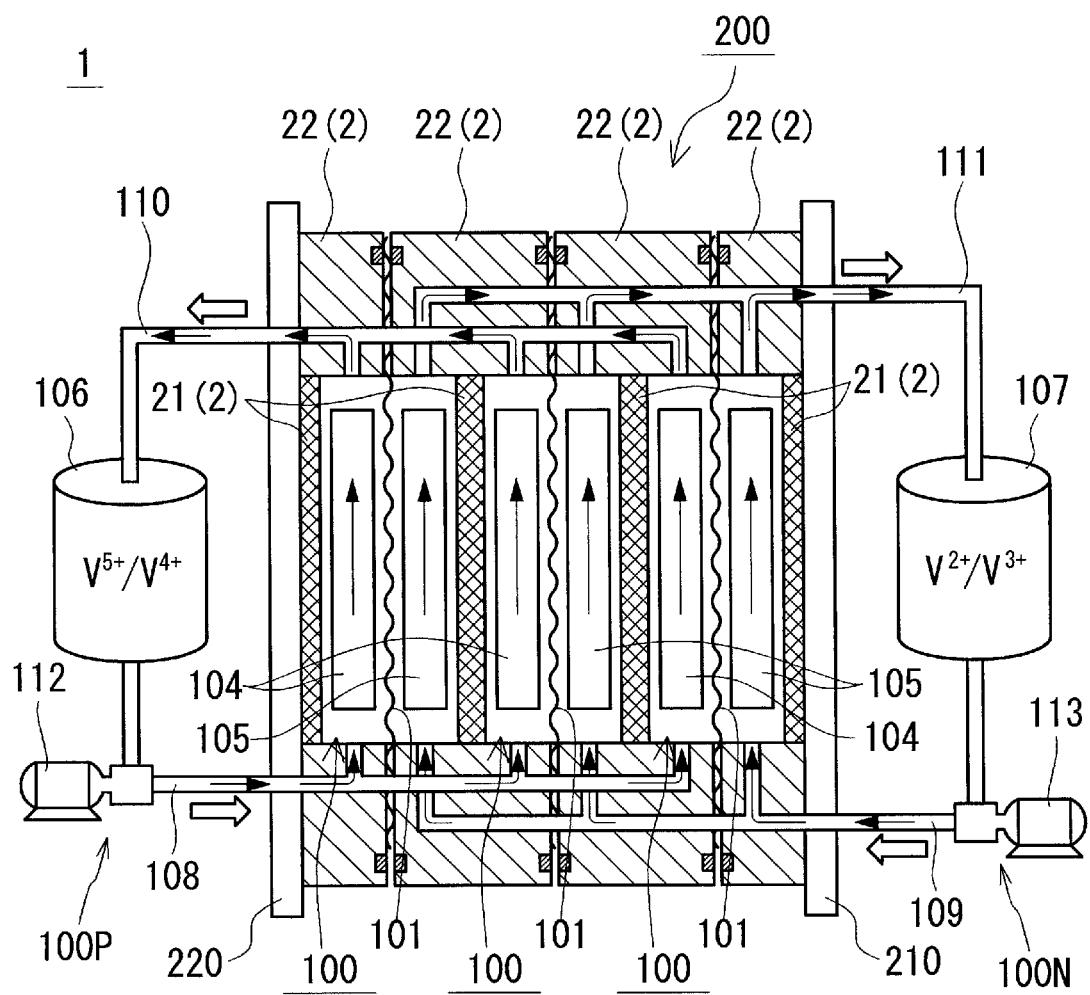
FIG. 2 is a schematic view of a redox flow battery.
Figure 3:
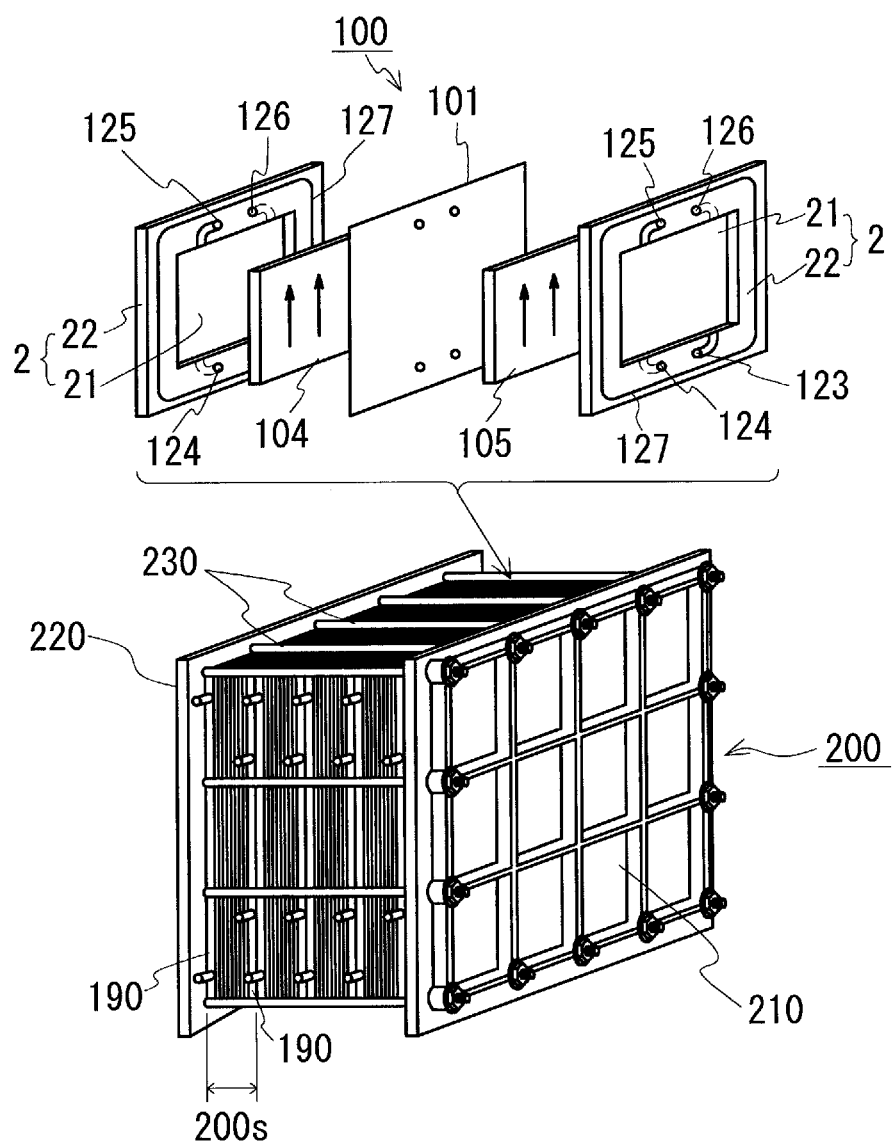
FIG. 3 is a schematic view of a cell stack.

The cell 100 is typically formed inside a structure called a cell stack 200, as illustrated in FIGS. 2 and 3. The cell stack 200 is formed by sandwiching a layered structure called a substack 200s (FIG. 3) with two end plates 210 and 220 on both sides of the layered structure, and then fastening the resulting structure with a fastening mechanism 230 (in the configuration illustrated in FIG. 3, a plurality of substacks 200s are included).

The substack 200s (FIG. 3) has a configuration in which cell frames 2, positive electrodes 104, membranes 101, and negative electrodes 105 are repeatedly stacked and the resulting layered body is sandwiched between supply/drainage plates 190 (refer to the lower part of FIG. 3, omitted in FIG. 2).

A cell frame 2 includes a frame body 22 having a through-window and a bipolar plate 2 that covers the through-window. That is, the frame body 22 supports the bipolar plate 21 from the outer periphery of the bipolar plate 21. The cell frame 2 can be produced by, for example, integrally forming the frame body 22 on an outer peripheral portion of the bipolar plate 21. Alternatively, the cell frame 2 can be produced by preparing the frame body 22 formed to have a thin portion along an outer peripheral edge of the through-window and the bipolar plate 21 produced separately from the frame body 22, and subsequently fitting an outer peripheral portion of the bipolar plate 21 into the thin portion of the frame body 22. A positive electrode 104 is disposed so as to be in contact with one surface of the bipolar plate 21 of the cell frame 2, and a negative electrode 105 is disposed so as to be in contact with the other surface of the bipolar plate 21. In this configuration, one cell 100 is formed between bipolar plates 21 fitted in adjacent cell frames 2.

Circulation of electrolytes to the cell 100 through the supply/drainage plates 190 illustrated in FIG. 3 is performed by liquid supply manifolds 123 and 124 and liquid drainage manifolds 125 and 126 that are formed in each cell frame 2. The positive electrolyte is supplied from the liquid supply manifold 123 through an inlet slit (refer to a curved channel indicated by a solid line) formed on one surface side of the cell frame 2 (on the front side of the drawing) to the positive electrode 104, and drained through an outlet slit (refer to a curved channel indicated by a solid line) formed in the upper part of the cell frame 2 into the liquid drainage manifold 125. Similarly, the negative electrolyte is supplied from the liquid supply manifold 124 through an inlet slit (refer to a curved channel indicated by a broken line) formed on the other surface side of the cell frame 2 (on the back side of the drawing) to the negative electrode 105, and drained through an outlet slit (refer to a curved channel indicated by a broken line) formed in the upper part of the cell frame 2 into the liquid drainage manifold 126. Ring-shaped sealing members 127, such as O-rings or flat gaskets, are disposed between cell frames 2 so as to suppress leakage of the electrolytes from the substack 200s.

<<RF Battery System>>

Figure 4:
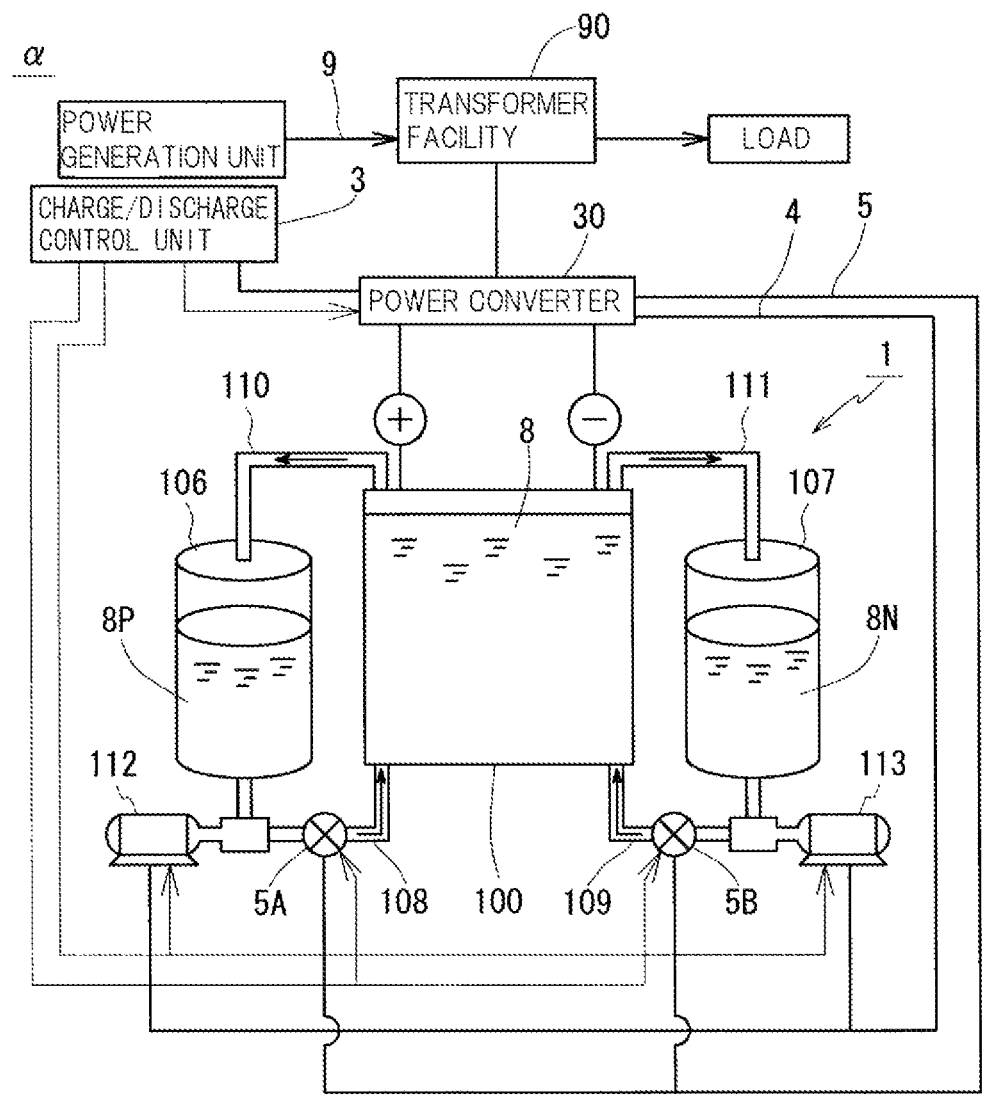
FIG. 4 is a schematic diagram of a redox flow battery system according to Embodiment 1.

On the basis of the basic configuration of the RF battery 1 described above, an RF battery system α according to an embodiment will be described with reference to FIG. 4. Although FIG. 4 illustrates the configuration of a cell 100 in a simplified manner, it may be considered that the cell 100 has a configuration similar to that in FIG. 3. Although FIG. 4 schematically illustrates an electrolyte 8 in the cell 100, a positive electrolyte 8P (refer to the inside of a positive electrolyte tank 106) and a negative electrolyte 8N (refer to the inside of a negative electrolyte tank 107) are not mixed in the cell 100.

The RF battery system α of this example includes an RF battery 1 and a charge/discharge control unit 3 that controls an operation of a power converter 30 to control charging and discharging of the cell 100. The charge/discharge control unit 3 of this example is connected to the power converter 30. The charge/discharge control unit 3 may be configured so that power is constantly supplied from the cell 100. Alternatively, the charge/discharge control unit 3 may be configured so that, during a period with no power failure in a power system 9, power is supplied from the power system 9, and during power failure in the power system 9, power is supplied from the cell 100. The cell 100 of the RF battery 1 performs charging and discharging between the RF battery 1 and the power system 9, as described with reference to FIG. 1. The tank 106 (107) of the RF battery 1 stores the electrolyte 8P (8N) supplied to the cell 100. A circulation pump 112 (113) of the RF battery 1 circulates the electrolyte 8P (8N) through pipes 108 and 110 (109 and 111) between the cell 100 and the tank 106 (107).

The RF battery system α of this example further includes a pump line 4 through which power is supplied to the circulation pump 112 (113), a valve 5A (5B) provided in the pipe 108 (109), and a valve line 5 through which power is supplied to the valves 5A and 5B. Here, the circulation pumps 112 and 113 and the valves 5A and 5B used in this example are those operated by an alternating current. When the power system 9 is a direct-current power transmission system, circulation pumps and valves that are operated by a direct current are used as the circulation pumps 112 and 113 and the valves 5A and 5B.

[Pump Line]

The pump line 4 through which power is supplied to the circulation pumps 112 and 113 extends from the power converter 30 to the circulation pumps 112 and 113. Unlike the example illustrated in the figure, the pump line 4 may be branched from a point between the power converter 30 and the power system 9 and may extend to the circulation pumps 112 and 113. With this configuration, during a period with no power failure in the power system 9, the circulation pumps 112 and 113 can be operated by the power from the power system 9, and during power failure in the power system 9, the circulation pumps 112 and 113 can be operated by using the power of the electrolyte 8 remaining in the cell 100. The amount of power supplied to the circulation pumps 112 and 113 is controlled by the charge/discharge control unit 3.

Operation signals of the circulation pumps 112 and 113 of this example are generated from the charge/discharge control unit 3 as indicated by the thin-line arrows. The operation signals are signals for switching ON/OFF of the circulation pumps 112 and 113.

[Valve]

The valve 5A is provided at a halfway position of the pipe 108 and regulates the amount of the positive electrolyte 8P supplied from the positive electrolyte tank 106 to the cell 100. Similarly, the valve 5B is provided at a halfway position of the pipe 109 and regulates the amount of the negative electrolyte 8N supplied from the negative electrolyte tank 107 to the cell 100. As the valves 5A and 5B, electrically operated valves driven by motors or electromagnetic valves driven by solenoids can be used.

[Valve Line]

The valve line 5 through which power is supplied to the valves 5A and 5B extends from the power converter 30 to the valves 5A and 5B. Unlike the example illustrated in the figure, the valve line 5 may be branched from a point between the power converter 30 and the power system 9 and may extend to the valves 5A and 5B. With this configuration, during a period with no power failure in the power system 9, the valves 5A and 5B can be operated by the power from the power system 9, and during power failure in the power system 9, the valves 5A and 5B can be operated by using the power of the electrolyte 8 remaining in the cell 100. Operation signals of the valves 5A and 5B of this example are generated from the charge/discharge control unit 3 as indicated by the thin-line arrows. The operation signals are signals for switching ON/OFF of the valves 5A and 5B.

<<Method for Operating RF Battery System>>

The RF battery system α having the configuration described above is operated as follows.

[During Normal Operation]

During a normal operation of the RF battery system α (during a period with no power failure), the charge/discharge control unit 3 of the RF battery system α, for example, monitors a voltage of the electrolyte 8 in the cell 100 with a monitor cell (not illustrated) to control charging and discharging of the cell 100 such that power of the electrolytes 8P and 8N in the cell 100 is not lower than power necessary for resuming circulation of the electrolytes 8P and 8N by the circulation pumps 112 and 113.

During the normal operation of the RF battery system α, in some cases, the circulation pumps 112 and 113 may be stopped to stop the circulation of the electrolytes 8P and 8N to the cell 100. An example of a situation in which the circulation pumps 112 and 113 are stopped is a case where the RF battery 1 is sufficiently charged. In this example, when the circulation of the electrolytes 8P and 8N is stopped, the charge/discharge control unit 3 of the RF battery system α closes the valves 5A and 5B to cause the electrolyte 8 to remain in the cell 100.

[During Power Failure in Power System]

During power failure in the power system 9, the charge/discharge control unit 3 of the RF battery system α operates the circulation pumps 112 and 113 using the power of the electrolyte 8 remaining in the cell 100 and discharges the power of the electrolytes 8P and 8N in the tanks 106 and 107 to the power system 9.

Specifically, the charge/discharge control unit 3 detects power failure in the power system 9 on the basis of a change in the voltage of the power system 9. Upon detection of power failure in the power system 9, in the case where the valves 5A and 5B are opened, the charge/discharge control unit 3 closes the valves 5A and 5B to cause the electrolyte 8 to remain in the cell 100 and then restarts in a dedicated mode during power failure. The power for restarting the charge/discharge control unit 3 is provided by the power of the electrolyte 8 remaining in the cell 100.

The charge/discharge control unit 3 that has started in the dedicated mode during power failure generates alternating-current power having a frequency optimal to operate the circulation pumps 112 and 113, operates the circulation pumps 112 and 113, and opens the valves 5A and 5B. Once the circulation pumps 112 and 113 operate, the electrolytes 8P and 8N in the tanks 106 and 107 are fed to the cell 100 and the power of the electrolytes 8P and 8N can also be drawn, and thus the operation of the circulation pumps 112 and 113 and the valves 5A and 5B can be continued. As a result, the power of the electrolytes 8P and 8N in the tanks 106 and 107 can be discharged to the power system 9.

<<Advantages>>

As described above, according to the RF battery system α and the method for operating the RF battery system α of this example, since the RF battery system α can perform discharging on its own during power failure in the power system 9, the RF battery system α does not require an UPS. Since no UPS is necessary, the following advantages can be achieved.

[1] Since the space for installing the UPS need not be secured, the degree of freedom of the installation location of the RF battery system α is high.

[2] The battery capacity of the RF battery system α can be enhanced by, for example, installing larger tanks 106 and 107 in the space that has been used as the space for installing the UPS.

[3] The labor and cost of the installation of the UPS can be reduced.

Embodiment 2

In Embodiment 2, an RF battery system β which differs from the system in Embodiment 1 in configuration for causing the electrolyte 8 to remain in the cell 100 will be described with reference to FIG. 5. Configurations that are the same as those of Embodiment 1 are assigned the same reference signs as those in FIG. 4, and the description thereof is omitted.

<<Overall Configuration>>

Figure 5:
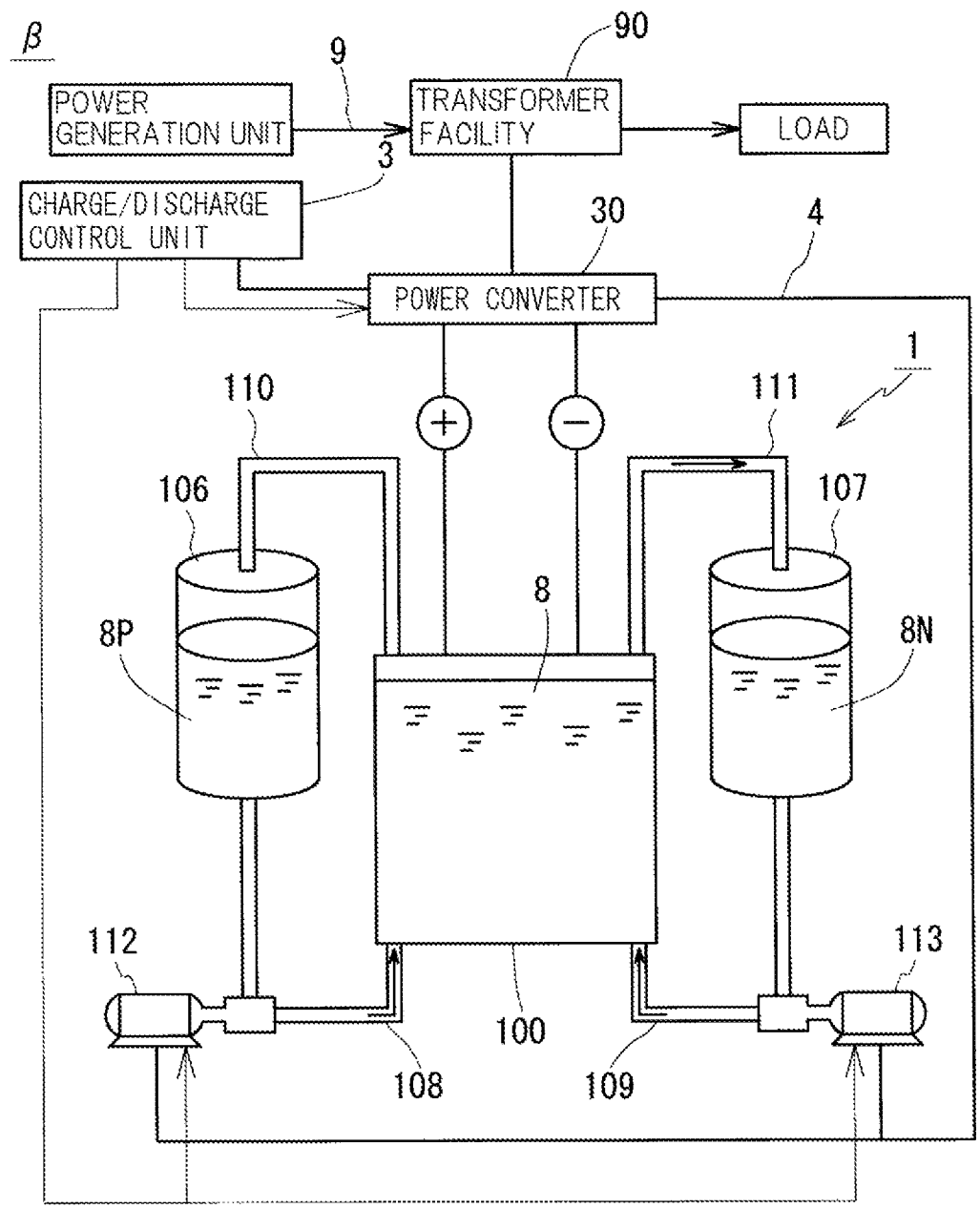
FIG. 5 is a schematic diagram of a redox flow battery system according to Embodiment 2.

In the configuration of Embodiment 2 illustrated in FIG. 5, tanks 106 and 107 are arranged such that liquid levels of electrolytes 8P and 8N in the tanks 106 and 107 are higher than an upper end of a cell 100. Herein, the upper end of the cell 100 is an upper end of a space in which the electrodes 104 and 105 illustrated in FIGS. 2 and 3 are arranged. With this configuration, regardless of operation or stop of circulation pumps 112 and 113, a state where an electrolyte 8 remains in the cell 100 can be provided.

<<Method for Operating RF Battery System>>

[During Normal Operation]

During a normal operation of the RF battery system β, a charge/discharge control unit 3 of the RF battery system β also, for example, monitors a voltage of the electrolyte 8 in the cell 100 with a monitor cell (not illustrated) to control charging and discharging of the cell 100 such that power of the electrolytes 8P and 8N in the cell 100 is not lower than power necessary for resuming circulation of the electrolytes 8P and 8N by the circulation pumps 112 and 113.

During the normal operation of the RF battery system β, in the case where the circulation pumps 112 and 113 are stopped to stop the circulation of the electrolytes 8P and 8N in the cell 100, the electrolyte 8 can be caused to remain in the cell 100 by simply stopping the circulation pumps 112 and 113. This is because the liquid levels of the electrolytes 8P and 8N in the tanks 106 and 107 are located higher than the upper end of the cell 100.

[During Power Failure in Power System]

During power failure in a power system 9, the charge/discharge control unit 3 of the RF battery system β operates the circulation pumps 112 and 113 using the power of the electrolyte 8 remaining in the cell 100 and discharges the power of the electrolytes 8P and 8N in the tanks 106 and 107 to the power system 9, as in the configuration of Embodiment 1.

Specifically, the charge/discharge control unit 3 detects power failure in the power system 9 from a decrease in the voltage of the power system 9. Upon detection of power failure in the power system 9, the charge/discharge control unit 3 restarts in a dedicated mode during power failure. The power for restarting the charge/discharge control unit 3 is provided by the power of the electrolyte 8 remaining in the cell 100. The charge/discharge control unit 3 that has started in the dedicated mode during power failure generates alternating-current power having a frequency optimal to operate the circulation pumps 112 and 113 and operates the circulation pumps 112 and 113. Once the circulation pumps 112 and 113 operate, the power of the electrolytes 8P and 8N can also be drawn and thus the operation of the circulation pumps 112 and 113 can be continued. As a result, the power of the electrolytes 8P and 8N in the tanks 106 and 107 can be discharged to the power system 9.

<<Advantages>>

The configuration of this example also does not require an UPS, and thus advantages that are the same as those in Embodiment 1 can be achieved. Furthermore, since the configuration of this example is a simple configuration in which the valves 5A and 5B (refer to FIG. 4) of Embodiment 1 and control thereof are not necessary, the configuration is easily constructed and has good maintainability.

<Use>

The RF battery systems α and β according to the embodiments can each be used as a storage battery system, with respect to new energy power generation, such as solar photovoltaic power generation or wind power generation, for the purpose of stabilizing fluctuation of power output, storing generated power during oversupply, leveling load, and the like. Furthermore, the RF battery systems α and β according to the embodiments can each be provided in a general power plant and used as a storage battery system having a large capacity as countermeasures against momentary voltage drop/power failure and for the purpose of leveling load.

The invention claimed is:

1. A redox flow battery system comprising:
    a cell configured to perform charging and discharging between the cell and a power system;
    a tank that stores an electrolyte supplied to the cell;
    a circulation pump configured to circulate the electrolyte between the cell and the tank, the circulation pump being configured to be operated by power from the power system;
    a power converter disposed between the cell and the power system; and
    a charge/discharge control unit configured to:
        control an operation of the power converter to control charging and discharging of the cell;
        detect power failure in the power system during which the circulation pump is stopped, stopping circulation of the electrolyte, in response to receiving no power from the power system; and
        when the power failure in the power system is detected, control the power converter such that power of the electrolyte remaining in the cell is supplied to the circulation pump to resume circulation of the electrolyte.

2. The redox flow battery system as claimed in claim 1, wherein the tank is positioned such that a liquid level of the electrolyte stored in the tank is higher than an upper end of the cell.

3. The redox flow battery system as claimed in claim 1, wherein a valve is provided in a pipe connected from the circulation pump to the cell, and when the circulation of the electrolyte is stopped, the charge/discharge control unit closes the valve to cause the electrolyte to remain in the cell.

4. The redox flow battery system as claimed in claim 1, wherein the charge/discharge control unit detects the power failure in the power system based on a change in a voltage of the power system.

* * * * *